(12) United States Patent
Koo

(10) Patent No.: US 9,667,705 B2
(45) Date of Patent: May 30, 2017

(54) METHOD OF DATA TRANSMISSION OVER MULTIPLE NETWORKS, AND APPARATUS THEREFOR

(71) Applicant: SK TELECOM CO., LTD., Seoul (KR)

(72) Inventor: Jahon Koo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 378 days.

(21) Appl. No.: 14/315,613

(22) Filed: Jun. 26, 2014

(65) Prior Publication Data

US 2014/0310381 A1 Oct. 16, 2014

Related U.S. Application Data

(63) Continuation of application No. PCT/KR2012/011129, filed on Dec. 20, 2012.

(30) Foreign Application Priority Data

Dec. 28, 2011 (KR) .................. 10-2011-0145149

(51) Int. Cl.
*G06F 15/16* (2006.01)
*H04L 29/08* (2006.01)
*H04W 88/06* (2009.01)
*H04W 48/18* (2009.01)

(52) U.S. Cl.
CPC ............ *H04L 67/10* (2013.01); *H04W 88/06* (2013.01); *H04W 48/18* (2013.01)

(58) Field of Classification Search
CPC . H04L 12/1868; H04L 1/0002; H04L 25/085; H04W 88/06

USPC ........................................................ 709/217
See application file for complete search history.

(56) References Cited

U.S. PATENT DOCUMENTS

2006/0203804 A1* 9/2006 Whitmore ........... H04L 12/5692
370/352
2009/0190524 A1* 7/2009 Liu ....................... H04W 28/24
370/328

FOREIGN PATENT DOCUMENTS

KR 1020070041096 A 4/2007
KR 1020090081639 A 7/2009
KR 1020100001015 A 1/2010
(Continued)

OTHER PUBLICATIONS

Korean Notice of Allowance for application No. 10-2011-0145149 dated Jun. 14, 2013.
(Continued)

*Primary Examiner* — Wing F Chan
*Assistant Examiner* — Andrew Woo
(74) *Attorney, Agent, or Firm* — Hauptman Ham, LLP

(57) ABSTRACT

A receiving apparatus includes a communication unit to receive partial data partitioned from data transmitted from a transmitting apparatus through two or more networks and transfer network state related information based on the partial data respectively received through each of the two or more networks to the transmitting apparatus through a transmission network to be designated; and a network selection unit to designate one network among the two or more networks as the transmission network for transmitting the network state related information, based on a time of receiving each of the partial data through each of the two or more networks.

17 Claims, 4 Drawing Sheets

(56) References Cited

FOREIGN PATENT DOCUMENTS

| KR | 1020110016749 A | 2/2011 |
|---|---|---|
| KR | 1020110097492 A | 8/2011 |

OTHER PUBLICATIONS

Korean Office Action for application No. 10-2011-0145149 dated Dec. 20, 2012.
International Search Report mailed Mar. 28, 2013 for PCT/KR2012/011129.

* cited by examiner

METHOD OF DATA TRANSMISSION OVER MULTIPLE NETWORKS, AND APPARATUS THEREFOR

CROSS-REFERENCE TO RELATED APPLICATION

The present application is a continuation of International Application No. PCT/KR2012/011129 filed on Dec. 20, 2012, which is based on, and claims priority from KR Application Serial Number 10-2011-0145149, filed on Dec. 28, 2011. The disclosures of the above-listed applications are hereby incorporated by reference herein in their entirety.

FIELD

The present disclosure relates to a method of data transmission over multiple networks and an apparatus therefor.

BACKGROUND

The statements in this section merely provide background information related to the present disclosure and do not constitute prior art.

Communication services based on a plurality of mobile communication networks such as WCDMA, CDMA, WiBro, Long Term Evolution (LTE) and the like are provided recently. In addition, communication services based on a WLAN (WiFi) network, i.e., a short range wireless network, are also provided.

Although the network environment is a multi-network environment in which various kinds of networks are mixed, it is known that only one network is selected from the multiple networks to transmit data.

The inventor(s) has noted that such a known method has a limit in providing a smooth data service since the load rate of the one selected network abruptly increases when a large amount of data are transmitted and received. In addition, the inventor(s) has noted that this known method is inappropriate in an environment in which a variety of wireless devices such as a smart phone, a tablet PC and the like are provided further more, and a variety of large-scale data services for such wireless devices are also provided further more.

SUMMARY

In accordance with another aspect of the present disclosure, A receiving apparatus comprises a communication unit and a network selection unit. The communication unit is configured to receive partial data partitioned from data transmitted from a transmitting apparatus through two or more networks and transfer network state related information based on the partial data respectively received through each of the two or more networks to the transmitting apparatus through a transmission network to be designated. And the network selection unit is configured to designate one network among the two or more networks as the transmission network for transmitting the network state related information, based on a time of receiving each of the partial data through each of the two or more networks.

In accordance with another aspect of the present disclosure, a receiving apparatus is configured to receive partial data partitioned from data transmitted from a transmitting apparatus through two or more networks; designate one network among the two or more networks as a transmission network based on a time of receiving each of the partial data through each of the two or more networks; and transfer network state related information based on the partial data received through each of the two or more networks to the transmitting apparatus through the designated transmission network.

In accordance with another aspect of the present disclosure, a transmitting apparatus comprises a transmitting unit and a receiving unit. The transmitting unit is configured to transmit partial data partitioned from data to a receiving apparatus through two or more networks. And the receiving unit is configured to receive network state related information based on the partial data through a designated transmission network, based on a time of receiving each of the partial data by the receiving apparatus through each of the two or more networks. The designated transmission network being one network among the two or more networks that is designated for transmitting the network state related information.

In accordance with another aspect of the present disclosure, a transmitting apparatus is configured to transmit partial data partitioned from data to a receiving apparatus through two or more networks; and receive network state related information based on the partial data through a designated transmission network, based on a time of receiving each of the partial data by the receiving apparatus through each of the two or more networks. The designated transmission network being one network among the two or more networks that is designated for transmitting the network state related information.

DETAILED DESCRIPTION

Some embodiments of the present disclosure will be hereafter described with reference to the accompanying drawings.

In order to provide a smooth data service in the multi-network environment, a simultaneous transmission service is proposed, in which a transmitting apparatus partitions a data into several partial data and simultaneously transmits the partitioned partial data to a receiving apparatus through two or more networks (i.e., multiple networks comprising two or more hetero networks). Meanwhile, in order to optimize such a simultaneous transmission service, it needs to promptly confirm a state of each network and control suspension or resumption of data transmission according to a result of the confirmation FIG. 1 is a schematic view of the configuration of a simultaneous data transmission system over multiple networks according to at least one embodiment of the present disclosure.

Figure 1:
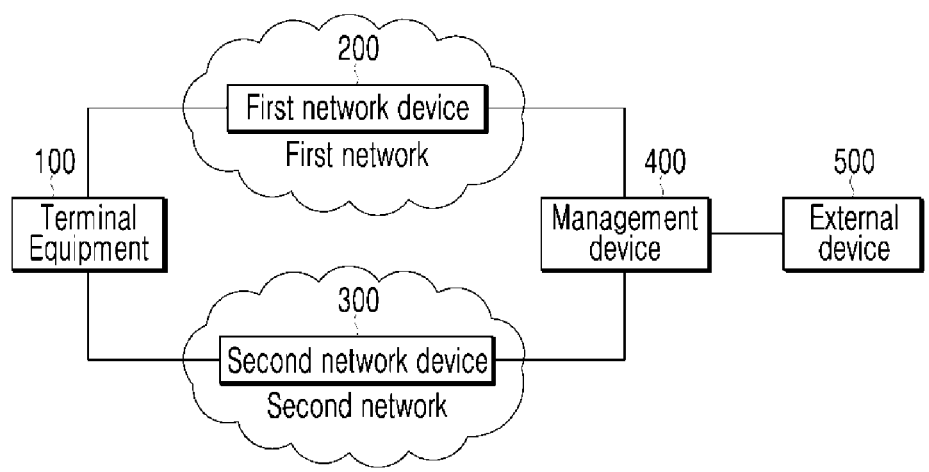
FIG. 1 is a schematic view of the configuration of a simultaneous data transmission system over multiple networks according to at least one

As shown in FIG. 1, the simultaneous data transmission system over multiple networks according to the present disclosure includes a management device 400 as a transmitting apparatus for partitioning a data into two or more partial data, transmitting a first partial data corresponding to a part of the two or more partial data, which includes specific virtual network connection information, and transmitting a second partial data corresponding to another part of the two or more partial data, which includes the virtual network connection information, a first network device 200 for receiving the first partial data from the management device 400, a second network device 300 for receiving the second partial data from the management device 400, and a terminal equipment 100 as a receiving apparatus for receiving the first partial data from the first network device 200 and the second partial data from the second network device 300 and creating the data by combining the first partial data and the second partial data according to the specific virtual network connection information based on the virtual network connection information included in the received first partial data and second partial data. In addition, the simultaneous data transmission system over multiple networks according to the present disclosure has a configuration including an external device 500 which transfers a transmission target data to the management device 400 and requests to transmit the transmission target data to the terminal equipment 100. Other components of the simultaneous data transmission system, such as the terminal equipment 100, the first network device 200, the second network device 300 and the management device 400 are implemented by one or more processors and/or application-specific integrated circuits (ASICs).

Here, the terminal equipment 100 refers to a user device for using a data service provided by an external device 500, such as a mobile terminal, a notebook computer, a tablet PC, a PDA or the like, and it is not limited thereto and includes all kinds of devices capable of transmitting and receiving data through both a first network and a second network.

In addition, the first network and the second network are a network such as WCDMA, CDMA, WiBro, WLAN (WiFi), Long Term Evolution (LTE) or the like, and they are not limited thereto and include all the networks (e.g., networks including one or more homo/hetero communication networks), for example, a Gateway GPRS Support Node (GGSN) of the 3G network. In addition, if the second network is a WiFi network, which is a kind of short range communication network, the second network device 300 corresponds to, for example, an access point (AP).

In addition, the management device 400 refers to a server device for supporting the simultaneous transmission service for the terminal equipment 100, which is positioned on the first network or the second network or on a network other than the first network and the second network and support the simultaneous transmission service.

The external device 500 refers to a server device or another terminal device performing data transmission and reception to and from the terminal equipment 100 through the management device 400 and provides the terminal equipment 100 with a variety of services such as a portal service, a contents providing service and the like by transmitting and receiving data through the management device 400.

Although the multiple networks are a variety of networks including, for example, WCDMA, CDMA, WiBro, WLAN (WiFi), Long Term Evolution (LTE) and the like, in the at least one embodiment, they are limited to the first network referring to a wireless packet service network (WCDMA) (hereinafter, referred to as a "3G network") and the second network referring to a short range wireless network (WiFi) (hereinafter, referred to as a "WiFi network") for the convenience of explanation.

Accordingly, the first network device 200 refers to Gateway GPRS Support Node (GGSN) equipment for operating the 3G network, i.e., a wireless packet service network, and, in addition, the second network device 300 refers to an access point (AP) for operating the WiFi network, i.e., a short range wireless network.

Meanwhile, in the case of an uplink for transmitting data from the terminal equipment 100 to the management device 400, the terminal equipment 100 works as a transmitting apparatus, and the management device 400 works as a receiving apparatus. Further, in the case of a downlink for transmitting data from the management device 400 to the terminal equipment 100, the terminal equipment 100 works as a receiving apparatus, and the management device 400 works as a transmitting apparatus.

In at least one embodiment, the downlink in which the management device 400 works as a transmitting apparatus and the terminal equipment 100 works as a receiving apparatus will be described for the convenience of explanation. However, the same method is applied to the uplink, and, therefore, the function of the terminal equipment 100 in the downlink is performed by the management device 400 in the uplink, and the function of the management device 400 in the downlink is performed by the terminal equipment 100 in the uplink.

The terminal equipment 100 receives partitioned partial data separately transmitted from the management device 400 via the first network device 200 and the second network device 300.

Further specifically, the terminal equipment 100 receives the first partial data through the first network device 200 and, in addition, the second partial data through the second network device 300 from the management device 400. In addition, the terminal equipment 100 restores (reconstructs or assembles) a transmission target data desired to be transmitted by the management device 400, by creating the data by combining the first partial data and the second partial data based on the virtual network connection information included in the received first partial data and the received second partial data. At this point, the terminal equipment 100 restores the transmission target data by recognizing the first partial data and the second partial data having the same virtual network connection information based on the virtual network connection information included in a plurality of the received partial data, rearranging the first partial data and the second partial data according to a partitioning sequence based on the sequence information included in the corresponding partial data, and combining normally rearranged partial data.

The terminal equipment 100 designates a transmission network in order to transmit network state related information based on reception of the partial data to the management device 400.

Further specifically, the terminal equipment 100 receives the first partial data through the first network device 200 and the second partial data through the second network device 300 from the management device 400 and designates an uplink path, i.e., a transmission network, for transmitting the network state related information based on the sequence information included in each of the received partial data. For example, it is assumed for convenience of explanation that the management device 400 transmits partial data packets of sequence information 1~6 to the terminal equipment 100 through the 3G network and the WiFi network. Further specifically, when it is assumed that the partial data packet of sequence information 1 and the partial data packets of sequence information 4 and 5 through the 3G network and transmits partial data packets of sequence information 2 and 3 and a partial data packet of sequence information 6 through the WiFi network, the terminal equipment 100 receives the partial data packet of sequence information 1 and the partial data packets of sequence information 4 and 5 through the first network device 200 (e.g., 3G network) and receives the partial data packets of sequence information 2 and 3 and the partial data packet of sequence information 6 through the second network device 300 (e.g., WiFi network). At this point, if the partial data packets of sequence information 2 and 3 are received through the second network device 300 earlier than the partial data packet of sequence information 1 received through the first network device 200, the terminal equipment 100 determines that the uplink transmission performance of the WiFi network is superior than the uplink transmission performance of the 3G network and designates the WiFi network as a transmission network for transmitting the network state related information to the management device 400.

Furthermore, the terminal equipment 100 transmits the network state related information based on reception of the partial data to the management device 400 through the designated transmission network.

Further specifically, if the WiFi network is designated as the transmission network through the determination of uplink transmission performance described above, the terminal equipment 100 transmits network state related information based on the first partial data and the second partial data received through the 3G network and the WiFi network to the management device 400 through the WiFi network designated as the transmission network. At this point, the terminal equipment 100 measures the network state related information in correspondence to a pair of marked partial data packets having adjacent sequence information among the partial data transmitted through the 3G network and the WiFi network and provide the management device 400 with the measured network state related information of the specific connection networks. Here, the network state related information includes information on a difference between the times of receiving the partial data, measuring a difference of time between a pair of marked partial data packets having adjacent sequence information, respectively arriving at a receiving apparatus, i.e., the terminal equipment 100, among the partial data transmitted from the management device 400 through each network. For example, the terminal equipment 100 will recognize reception of marked partial data having adjacent sequence information on the 3G network, i.e., partial data packets of sequence information 4 and 5, measure a difference between the times of receiving the partial data packet of sequence information 4 and the partial data packet of sequence information 5, and provide the management device 400 with network state related information corresponding to the 3G network, including information on the measured difference between the times of receiving the partial data, through the designated transmission network (WiFi network). In addition, the terminal equipment 100 recognizes reception of marked partial data having adjacent sequence information on the WiFi network, i.e., partial data packets of sequence information 2 and 3, measures a difference between the times of receiving the partial data packet of sequence information 2 and the partial data packet of sequence information 3, and provide the management device 400 with network state related information corresponding to the WiFi network, including information on the measured difference between the times of receiving the partial data, through the designated transmission network (WiFi network).

Meanwhile, when a request for changing designation of the transmission network is received from the management device 400, the terminal equipment 100 changes designation of the transmission network to a previously designated transmission network.

Further specifically, when a request for changing the WiFi network previously designated as the transmission network to the 3G network is received from the management device 400, the terminal equipment 100 designates the 3G network as the transmission network for transmitting the network state related information to the management device 400. In relation to this, the management device 400 confirms a packet loss rate of the transmission network (the WiFi network) designated by the terminal equipment 100 by counting the number of network state related information (expected report count, ERC) received through the transmission network (the WiFi network) designated by the terminal equipment 100 and comparing the counted number and the number of pairs of the marked and transmitted partial data packets, in correspondence to the pairs of marked partial data packets having adjacent sequence information among the partial data transmitted through the 3G network and the WiFi network. At this point, if the counted number is, for example, smaller than the number of pairs of the partial data packets marked and transmitted through each network or a specified number, the management device 400 determines that the uplink transmission performance of the transmission network (the WiFi network) designated by the terminal equipment 100 is degraded and transfers a request for changing designation of the transmission network to the 3G network through the 3G network, i.e., through the first network device 200.

Furthermore, the terminal equipment 100 confirms uplink transmission performance of the WiFi network while the 3G network is designated as the transmission network.

Further specifically, while designation of the transmission network is changed to the 3G network in response to the request of the management device 400, the terminal equipment 100 determines whether or not to re-designate the WiFi network as the transmission network by transmitting an operation confirmation message (e.g., KEEP_ALIVE_REQ) corresponding to the WiFi network to the management device 400 through the second network device 300 and determining uplink transmission performance of the WiFi network based on a reception state of a response message (e.g., KEEP_ALIVE_RSP) in response to the transmitted operation confirmation message. At this point, the terminal equipment 100 transmits the network state related information to the management device 400 through the re-designated 3G network in response to the partial data received through the first network device 200 and the second network device 300, transmits an operation confirmation message (e.g., KEEP_ALIVE_REQ) corresponding to the WiFi network to the management device 400 through the second network device 300, and determines uplink transmission performance of the WiFi network based on a reception state of a response message (e.g., KEEP_ALIVE_RSP) in response to the transmitted operation confirmation message. In relation to this, the terminal equipment 100 transmits the operation confirmation message (e.g., KEEP_ALIVE_REQ) corresponding to the WiFi network as many as a predetermined number of times, for example, three times or more, through the second network device 300 and determines that the uplink transmission performance of the WiFi network is favorable if the response messages (e.g., KEEP_ALIVE_RSP) are successively received as many as the predetermined number of times of the transmitted operation confirmation messages.

Accordingly, the terminal equipment 100 re-designates the WiFi network as the transmission network.

Further specifically, if it is determined that the uplink transmission performance of the WiFi network is favorable as a result of confirming the uplink transmission performance through the operation confirmation message (e.g., KEEP_ALIVE_REQ) as described above, the terminal equipment 100 re-designates the WiFi network as the transmission network, from the currently designated 3G network, and uses the re-designated WiFi network thereafter as the transmission network when transmitting the network state related information based on the received partial data.

The management device 400 selects a partial data partitioned from a transmission target data for each network according to data transmission rates variably set between networks.

Further specifically, the management device 400 confirms data transmission rates variably set between networks according to activation of a simultaneous transmission mode, i.e., a first transmission rate for transmitting data to the first network device 200 and a second transmission rate for transmitting data to the second network device 300. Further, the management device 400 selects a first partial data to be transmitted to the first network device 200 among the partial data partitioned from the transmission target data received from the external device 500 based on the confirmed transmission rates and, in addition, selects a second partial data to be transmitted to the second network device 300 among the other partial data. In relation to this, the management device 400 dynamically and variably sets the data transmission rates between the networks based on a variety of factors, such as network characteristics, a current load state, a type of transmission target data and the like of each network, and transmits a partial data on each network according to the set data transmission rates.

In addition, the management device 400 transmits the selected partial data using a corresponding network.

Further specifically, the management device 400 transmits the partial data selected in correspondence to the transmission network, i.e., transmits the first partial data to the first network device 200 positioned in the 3G network so that the first network device 200 transmits the first partial data to the terminal equipment 100 working as a receiving apparatus and, simultaneously, transmits the second partial data to the second network device 300 positioned in the WiFi network so that the second network device 300 transmits the second partial data to the terminal equipment 100 working as a receiving apparatus.

In addition, the management device 400 receives, from the terminal equipment 100, the network state related information based on the partial data transmitted through the transmission network designated by the terminal equipment 100.

Further specifically, the management device 400 transmits marked partial data having adjacent sequence information on the 3G network, i.e., partial data packets of sequence information 4 and 5, to the terminal equipment 100 through the first network device 200 and receives the network state related information corresponding to the 3G network, including information on a difference between the times of receiving the partial data packet of sequence information 4 and the partial data packet of sequence information 5, from the terminal equipment 100 through the designated transmission network (the WiFi network). In addition, the management device 400 recognizes reception of marked partial data having adjacent sequence information on the WiFi network, e.g., partial data packets of sequence information 2 and 3, and measures a difference between the times of receiving the partial data packet of sequence information 2 and the partial data packet of sequence information 3, and the management device 400 receives the network state related information corresponding to the WiFi network, including information on the measured difference between the times of receiving the partial data, from the terminal equipment 100 through the designated transmission network (the WiFi network).

Furthermore, the management device 400 senses degradation of uplink transmission performance for the transmission network designated by the terminal equipment 100 and requests re-designation of the transmission network.

Further specifically, the management device 400 confirms a packet loss rate of the transmission network (the WiFi network) designated by the terminal equipment 100 by counting the number of network state related information (expected report count, ERC) received through the transmission network (the WiFi network) designated by the terminal equipment 100 and comparing the counted number and the number of pairs of the marked and transmitted partial data packets, in correspondence to the pairs of marked partial data packets having adjacent sequence information among the partial data transmitted through the 3G network and the WiFi network. At this point, if the counted number is, for example, smaller than the number of pairs of the partial data packets marked and transmitted via each network or a specified number, the management device 400 determines that the uplink transmission performance of the transmission network (the WiFi network) designated by the terminal equipment 100 is degraded and transfers a request for changing designation of the transmission network to the 3G network through the 3G network, i.e., through the first network device 200.

Figure 2:
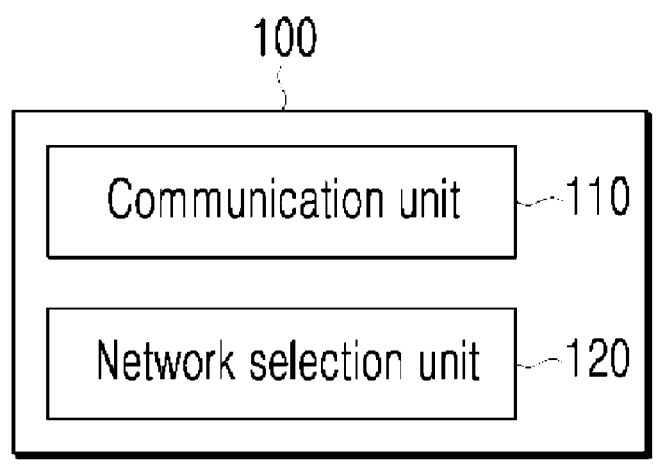
FIG. 2 is a schematic view of the configuration of a terminal equipment according to at least one embodiment of the present disclosure.

Hereinafter, a further specific configuration of the terminal equipment 100 according to at least one embodiment of the present disclosure will be described with reference to FIG. 2.

That is, the terminal equipment 100 includes a communication unit 110 for receiving partitioned partial data separately transmitted from the first network device 200 and the second network device 300, and a network selection unit 120 for designating a transmission network in order to transmit network state related information based on reception of the partial data to the management device 400. Other components of the terminal equipment 100, such as the communication unit 110 and the network selection unit 120 are implemented by one or more processors and/or application-specific integrated circuits (ASICs).

The communication unit 110 receives the partitioned partial data separately transmitted from the first network device 200 and the second network device 300.

Further specifically, the communication unit 110 receives the first partial data through the first network device 200 and, in addition, the second partial data through the second network device 300 from the management device 400. In addition, the communication unit 110 restores a transmission target data desired to be transmitted by the management device 400, by creating the data by combining the first partial data and the second partial data based on the virtual network connection information included in the received first partial data and second partial data. At this point, the communication unit 110 restores the transmission target data by recognizing the first partial data and the second partial data having the same virtual network connection information based on the virtual network connection information included in a plurality of the received partial data, rearranging the first partial data and the second partial data according to a partitioning sequence based on the sequence information included in the corresponding partial data, and combining normally rearranged partial data.

Furthermore, the communication unit 110 transmits the network state related information based on reception of the partial data to the management device 400 through the designated transmission network.

Further specifically, if the WiFi network is designated as the transmission network through the determination of uplink transmission performance described above, the communication unit 110 transmits network state related information based on the first partial data and the second partial data received through the 3G network and the WiFi network to the management device 400 through the WiFi network designated as the transmission network. At this point, the communication unit 110 measures the network state related information in correspondence to a pair of marked partial data packets having adjacent sequence information among the partial data transmitted through the 3G network and the WiFi network and provide the management device 400 with the measured network state related information of the specific connection networks. Here, the network state related information includes information on a difference between the times of receiving the partial data, measuring a difference of time between a pair of marked partial data packets having adjacent sequence information, respectively arriving at a receiving apparatus, i.e., the terminal equipment 100, among the partial data transmitted from the management device 400 through each network.

In relation to this, the network selection unit 120 designates a transmission network in order to transmit the network state related information based on reception of the partial data to the management device 400.

Further specifically, the network selection unit 120 designates an uplink path, i.e., a transmission network, for transmitting the network state related information based on the sequence information included in each of the partial data received through the first network device 200 and the second network device 300. For example, if it is described assuming that the management device 400 transmits a partial data packet of sequence information 1 and partial data packets of sequence information 4 and 5 through the 3G network and transmits partial data packets of sequence information 2 and 3 and a partial data packet of sequence information 6 through the WiFi network, the communication unit 110 receives the partial data packet of sequence information 1 and the partial data packets of sequence information 4 and 5 through the first network device 200 and receives the partial data packets of sequence information 2 and 3 and the partial data packet of sequence information 6 through the second network device 300. At this point, if the partial data packets of sequence information 2 and 3 are received through the second network device 300 earlier than the partial data packet of sequence information 1 received through the first network device 200, the network selection unit 120 determines that the uplink transmission performance of the WiFi network is superior than the uplink transmission performance of the 3G network and designates the WiFi network as a transmission network for transmitting the network state related information to the management device 400.

Meanwhile, when a request for changing designation of the transmission network is received from the management device 400, the network selection unit 120 changes designation of the transmission network from a currently designated transmission network to another transmission network (e.g., a previously designated transmission network).

Further specifically, when a request for changing the WiFi network currently designated as the transmission network to the 3G network is received from the management device 400, the network selection unit 120 designates the 3G network as the transmission network for transmitting the network state related information to the management device 400.

Furthermore, the network selection unit 120 confirms uplink transmission performance of the WiFi network while the 3G network is designated as the transmission network.

Further specifically, while designation of the transmission network is changed to the 3G network in response to the request of the management device 400, the network selection unit 120 determines whether or not to re-designate the WiFi network as the transmission network by transmitting an operation confirmation message (e.g., KEEP_ALIVE_REQ) corresponding to the WiFi network to the management device 400 through the second network device 300 and determining uplink transmission performance of the WiFi network based on a reception state of a response message (e.g., KEEP_ALIVE_RSP) in response to the transmitted operation confirmation message. At this point, the network selection unit 120 transmits an operation confirmation message (e.g., KEEP_ALIVE_REQ) corresponding to the WiFi network to the management device 400 through the second network device 300 according to the operation of the communication unit 110 transmitting the network state related information to the management device 400 through the re-designated 3G network in response to the partial data received through the first network device 200 and the second network device 300, and determines uplink transmission performance of the WiFi network based on a reception state of a response message (e.g., KEEP_ ALIVE_RSP) in response to the transmitted operation confirmation message. In relation to this, the network selection unit 120 transmits the operation confirmation message (e.g., KEEP_ALIVE_REQ) corresponding to the WiFi network as many as a predetermined number of times, for example, three times or more, through the second network device 300 and determines that the uplink transmission performance of the WiFi network is favorable if the response messages (e.g., KEEP_ALIVE_RSP) are successively received as many as the predetermined number of times of the transmitted operation confirmation messages.

Accordingly, the network selection unit 120 re-designates the WiFi network as the transmission network.

Further specifically, if it is determined that the uplink transmission performance of the WiFi network is favorable as a result of confirming the uplink transmission performance through the operation confirmation message (e.g., KEEP_ ALIVE_REQ) as described above, the network selection unit 120 re-designates the WiFi network as the transmission network, from the currently designated the 3G network, and uses the re-designated WiFi network thereafter as the transmission network when transmitting the network state related information based on the received partial data.

As described above, according to the simultaneous data transmission system over multiple networks of the present disclosure, in an environment of providing a simultaneous transmission service for partitioning a data into a plurality of partial data and transmitting and receiving the partitioned partial data through a plurality of networks, since an uplink state of each network is promptly confirmed using report information related to a network state and transmission of data to a corresponding network is suspended or resumed according to existence of abnormality, transmission performance of the simultaneous transmission service is guaranteed and improved.

Figure 3:
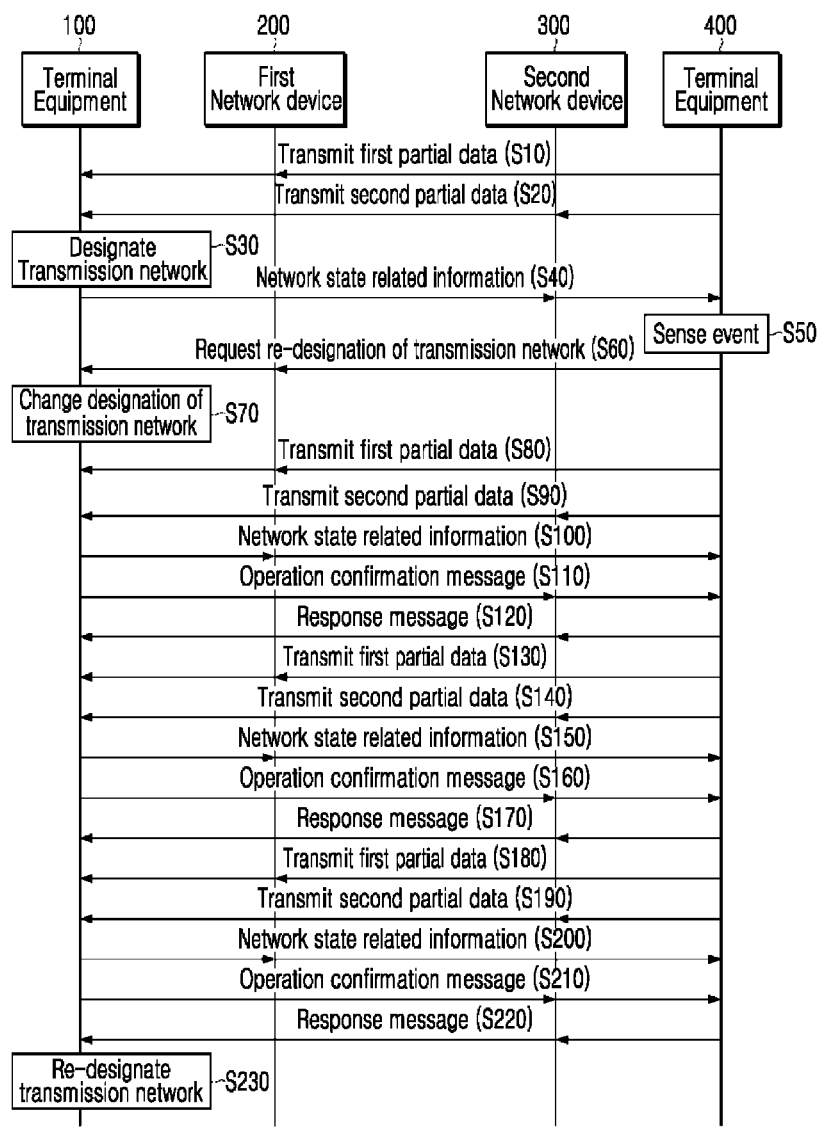
FIG. 3 is a schematic flowchart of operation of a simultaneous data transmission system over multiple networks according to at least one embodiment of the present disclosure.
Figure 4:
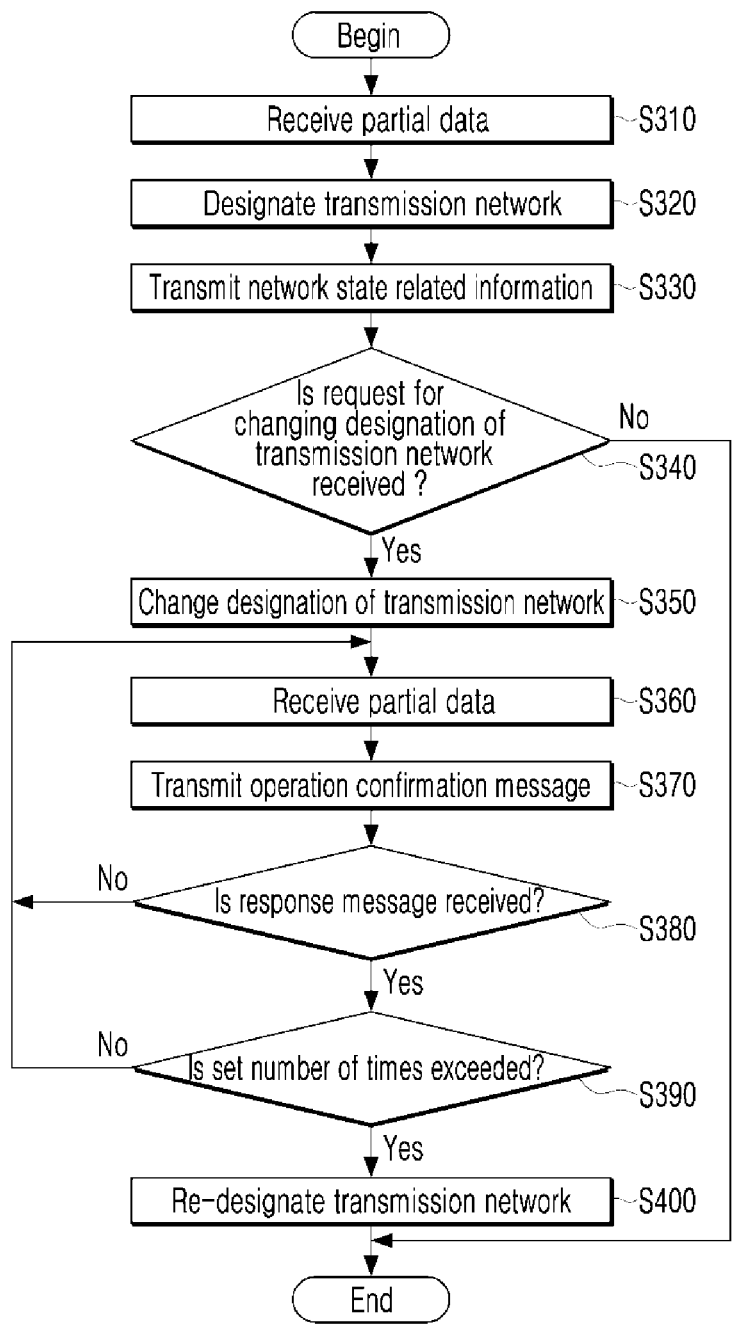
FIG. 4 is a schematic flowchart of operation of a terminal equipment according to at least one embodiment of the present disclosure.

Hereinafter, a simultaneous data transmission method over multiple networks according to at least one embodiment of the present disclosure will be described with reference to FIGS. 3 and 4. Here, the configuration shown in FIGS. 1 and 2 will be described using corresponding reference numerals for the convenience of explanation.

First of all, the operation method of the simultaneous data transmission system over multiple networks according to at least one embodiment of the present disclosure will be described with reference to FIG. 3.

First, the management device 400 selects partial data partitioned from a transmission target data for each network according to data transmission rates variably set between networks and transmits the selected partial data to the terminal equipment 100 S10 and S20.

Then, the terminal equipment 100 designates a transmission network in order to transmit network state related information based on reception of the partial data to the management device 400 S30.

The terminal equipment 100 receives the first partial data through the first network device 200 and the second partial data through the second network device 300 from the management device 400 and designates an uplink path, i.e., a transmission network, for transmitting the network state related information based on the sequence information included in each of the received partial data. For example, if it is described assuming that the management device 400 transmits a partial data packet of sequence information 1 and partial data packets of sequence information 4 and 5 through the 3G network and transmits partial data packets of sequence information 2 and 3 and a partial data packet of sequence information 6 through the WiFi network, the terminal equipment 100 receives the partial data packet of sequence information 1 and the partial data packets of sequence information 4 and 5 through the first network device 200 and receives the partial data packets of sequence information 2 and 3 and the partial data packet of sequence information 6 through the second network device 300. At this point, if the partial data packets of sequence information 2 and 3 are received through the second network device 300 earlier than the partial data packet of sequence information 1 received through the first network device 200, the terminal equipment 100 determines that the uplink transmission performance of the WiFi network is superior than the uplink transmission performance of the 3G network and designates the WiFi network as a transmission network for transmitting the network state related information to the management device 400.

Next, the terminal equipment 100 transmits the network state related information based on reception of the partial data to the management device 400 through the designated transmission network S40.

If the WiFi network is designated as the transmission network through the determination of uplink transmission performance described above, the terminal equipment 100 transmits network state related information based on the first partial data and the second partial data received through the 3G network and the WiFi network to the management device 400 through the WiFi network designated as the transmission network. At this point, the terminal equipment 100 measures the network state related information in correspondence to a pair of marked partial data packets having adjacent sequence information among the partial data transmitted through the 3G network and the WiFi network and provide the management device 400 with the measured network state related information of the specific connection networks. Here, the network state related information includes information on a difference between the times of receiving the partial data, measuring a difference of time between a pair of marked partial data packets having adjacent sequence information, respectively arriving at a receiving apparatus, i.e., the terminal equipment 100, among the partial data transmitted from the management device 400 on each network. For example, the terminal equipment 100 will recognize reception of marked partial data having adjacent sequence information on the 3G network, i.e., partial data packets of sequence information 4 and 5, measure a difference between the times of receiving the partial data packet of sequence information 4 and the partial data packet of sequence information 5, and provide the management device 400 with network state related information corresponding to the 3G network, including information on the measured difference between the times of receiving the partial data, through the designated transmission network (WiFi network). In addition, the terminal equipment 100 recognizes reception of marked partial data having adjacent sequence information on the WiFi network, i.e., partial data packets of sequence information 2 and 3, measures a difference between the times of receiving the partial data packet of sequence information 2 and the partial data packet of sequence information 3, and provide the management device 400 with network state related information corresponding to the WiFi network, including information on the measured difference between the times of receiving the partial data, through the designated transmission network (WiFi network).

Next, the management device 400 senses degradation of uplink transmission performance for the transmission network designated by the terminal equipment 100 and requests re-designation of the transmission network S50 and S60.

The management device 400 confirms a packet loss rate of the transmission network (the WiFi network) designated by the terminal equipment 100 by counting the number of network state related information (expected report count, ERC) received through the transmission network (the WiFi network) designated by the terminal equipment 100 and comparing the counted number and the number of pairs of the marked and transmitted partial data packets, in correspondence to the pairs of marked partial data packets having adjacent sequence information among the partial data transmitted through the 3G network and the WiFi network. At this point, if the counted number is, for example, smaller than the number of pairs of the partial data packets marked and transmitted on each network or a specified number, the management device 400 determines that the uplink transmission performance of the transmission network (the WiFi network) designated by the terminal equipment 100 is degraded and transfers a request for changing designation of the transmission network to the 3G network through the 3G network, i.e., through the first network device 200.

Furthermore, when a request for changing designation of the transmission network is received from the management device 400, the terminal equipment 100 changes designation of the transmission network to a previously designated transmission network S70.

When a request for changing the WiFi network previously designated as the transmission network to the 3G network is received from the management device 400, the terminal equipment 100 designates the 3G network as the transmission network for transmitting the network state related information to the management device 400.

Then, the terminal equipment 100 confirms uplink transmission performance of the WiFi network while the 3G network is designated as the transmission network S80 to S220.

While designation of the transmission network is changed to the 3G network in response to the request of the management device 400, the terminal equipment 100 determines whether or not to re-designate the WiFi network as the transmission network by transmitting an operation confirmation message (e.g., KEEP_ALIVE_REQ) corresponding to the WiFi network to the management device 400 through the second network device 300 and determining uplink transmission performance of the WiFi network based on a reception state of a response message (e.g., KEEP_ALIVE_RSP) in response to the transmitted operation confirmation message. At this point, the terminal equipment 100 transmits the network state related information to the management device 400 through the re-designated 3G network in response to the partial data received through the first network device 200 and the second network device 300, transmits an operation confirmation message (e.g., KEEP_ALIVE_REQ) corresponding to the WiFi network to the management device 400 through the second network device 300, and determines uplink transmission performance of the WiFi network based on a reception state of a response message (e.g., KEEP_ALIVE_RSP) in response to the transmitted operation confirmation message. In relation to this, the terminal equipment 100 transmits the operation confirmation message (e.g., KEEP_ALIVE_REQ) corresponding to the WiFi network as many as a predetermined number of times, for example, three times or more, through the second network device 300 and determines that the uplink transmission performance of the WiFi network is favorable if the response message (e.g., KEEP_ ALIVE_RSP) is successively received in correspondence to the number of times of transmission.

Next, the terminal equipment 100 re-designates the WiFi network as the transmission network S230.

If it is determined that the uplink transmission performance of the WiFi network is favorable as a result of confirming the uplink transmission performance through the operation confirmation message (e.g., KEEP_ALIVE_REQ) as described above, the terminal equipment 100 re-designates the WiFi network as the transmission network, designation of which is currently changed to the 3G network, and uses the re-designated WiFi network thereafter as the transmission network when transmitting the network state related information based on the received partial data.

Hereinafter, the operation method of the terminal equipment 100 according to at least one embodiment of the present disclosure will be described with reference to FIG. 4.

First, the communication unit 110 receives partitioned partial data separately transmitted from the first network device 200 and the second network device 300 S310.

Then, the network selection unit 120 designates a transmission network in order to transmit the network state related information based on reception of the partial data to the management device 400 S320.

The network selection unit 120 designates an uplink path, i.e., a transmission network, for transmitting the network state related information based on the sequence information included in each of the partial data received through the first network device 200 and the second network device 300. For example, if it is described assuming that the management device 400 transmits a partial data packet of sequence information 1 and partial data packets of sequence information 4 and 5 through the 3G network and transmits partial data packets of sequence information 2 and 3 and a partial data packet of sequence information 6 through the WiFi network, the communication unit 110 receives the partial data packet of sequence information 1 and the partial data packets of sequence information 4 and 5 through the first network device 200 and receives the partial data packets of sequence information 2 and 3 and the partial data packet of sequence information 6 through the second network device 300. At this point, if the partial data packets of sequence information 2 and 3 are received through the second network device 300 earlier than the partial data packet of sequence information 1 received through the first network device 200, the network selection unit 120 determines that the uplink transmission performance of the WiFi network is superior than the uplink transmission performance of the 3G network and designates the WiFi network as a transmission network for transmitting the network state related information to the management device 400.

Next, the communication unit 110 transmits the network state related information based on reception of the partial data to the management device 400 through the designated transmission network S330.

If the WiFi network is designated as the transmission network through the determination of uplink transmission performance described above, the communication unit 110 transmits network state related information based on the first partial data and the second partial data received through the 3G network and the WiFi network to the management device 400 through the WiFi network designated as the transmission network. At this point, the communication unit 110 measures the network state related information in correspondence to a pair of marked partial data packets having adjacent sequence information among the partial data transmitted through the 3G network and the WiFi network and provide the management device 400 with the measured network state related information of the specific connection networks. Here, the network state related information includes information on a difference between the times of receiving the partial data, measuring a difference of time between a pair of marked partial data packets having adjacent sequence information, respectively arriving at a receiving apparatus, i.e., the terminal equipment 100, among the partial data transmitted from the management device 400 on each network.

Next, when a request for changing designation of the transmission network is received from the management device 400, the network selection unit 120 changes designation of the transmission network to a previously designated transmission network S340 and S350.

When a request for changing the WiFi network previously designated as the transmission network to the 3G network is received from the management device 400, the network selection unit 120 designates the 3G network as the transmission network for transmitting the network state related information to the management device 400.

Furthermore, the network selection unit 120 confirms uplink transmission performance of the WiFi network while the 3G network is designated as the transmission network S360 to S390.

While designation of the transmission network is changed to the 3G network in response to the request of the management device 400, the network selection unit 120 determines whether or not to re-designate the WiFi network as the transmission network by transmitting an operation confirmation message (e.g., KEEP_ALIVE_REQ) corresponding to the WiFi network to the management device 400 through the second network device 300 and determining uplink transmission performance of the WiFi network based on a reception state of a response message (e.g., KEEP_ALIVE_RSP) in response to the transmitted operation confirmation message. At this point, the network selection unit 120 transmits an operation confirmation message (e.g., KEEP_ALIVE_REQ) corresponding to the WiFi network to the management device 400 through the second network device 300 according to the operation of the communication unit 110 transmitting the network state related information to the management device 400 through the re-designated 3G network in response to the partial data received through the first network device 200 and the second network device 300, and determines uplink transmission performance of the WiFi network based on a reception state of a response message (e.g., KEEP_ ALIVE_RSP) in response to the transmitted operation confirmation message. In relation to this, the network selection unit 120 transmits the operation confirmation message (e.g., KEEP_ALIVE_REQ) corresponding to the WiFi network as many as a predetermined number of times, for example, three times or more, through the second network device 300 and determines that the uplink transmission performance of the WiFi network is favorable if the response message (e.g., KEEP_ALIVE_RSP) is successively received in correspondence to the number of times of transmission.

Next, the network selection unit 120 re-designates the WiFi network as the transmission network S400.

If it is determined that the uplink transmission performance of the WiFi network is favorable as a result of confirming the uplink transmission performance through the operation confirmation message (e.g., KEEP_ALIVE_REQ) as described above, the network selection unit 120 re-designates the WiFi network as the transmission network, designation of which is currently changed to the 3G network, and uses the re-designated WiFi network thereafter as the transmission network when transmitting the network state related information based on the received partial data.

The simultaneous data transmission method over multiple networks according to the various embodiments of the present disclosure is implemented in the form of program commands that is executed through various computer means and recorded in a non-transitory computer-readable recording medium. The non-transitory computer-readable recording medium includes a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that are executed by a computer using an interpreter or the like, as well as a machine code generated by a compiler. The hardware devices are configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

According to some embodiments in the present disclosure, an uplink state of each network is promptly confirmed using report information related to a network state, and transmission of data to a corresponding network is suspended or resumed according to existence of abnormality.

Although various exemplary embodiments of the present disclosure has been described for illustrative purposes, those skilled in the art will appreciate that various modifications, additions and substitutions are possible, without departing from the scope and spirit of the claimed invention as disclosed in the accompanying claims. Accordingly, the present disclosure is not limited to the embodiments disclosed in the specification of the present disclosure. The scope of the claimed invention is to be determined by not only the following claims but also their equivalents. Specific terms used in this disclosure and drawings are used for illustrative purposes and not to be considered as limitations of the present disclosure.

What is claimed is:

1. A receiving apparatus comprising:
a communication unit, implemented by one or more processors, configured to
receive two or more partial data transmitted from a transmitting apparatus, wherein the two or more partial data are partitioned from data and are simultaneously transmitted through two or more networks including at least first and second networks being different networks of a heterogeneous network, and the two or more partial data include one or more first partial data transmitted through the first network and one or more second partial data transmitted through the second network, and
transfer network state related information to the transmitting apparatus, the network state related information including information on a difference between times of receiving the two or more partial data through the first network and the second network; and
a network selection unit, implemented by one or more processors, configured to
determine uplink transmission performance based on the times of receiving the two or more partial data respectively transmitted through the first network and the second network of the two or more network, and
designate the first network for a uplink path among the two or more networks based on the determination of the uplink transmission performance, the uplink path used for transmitting to the transmitting apparatus the network state related information,
wherein when a request for changing the uplink path is received from the transmitting apparatus, the network selection unit is configured to change the uplink path to be designated from the first network to the second network.

2. The receiving apparatus of claim 1, wherein when the transmitting apparatus receives the network state related information transferred through the first network, the network selection unit is configured to
   receive the request for changing the uplink path from the transmitting apparatus, and
   change the uplink path from the first network to the second network among the two or more networks.

3. The receiving apparatus of claim 1, wherein the network selection unit is configured to
   transmit to the transmitting apparatus an operation confirmation message through the first network while the uplink path is currently designated from the first network to the second network, and
   determine whether or not to re-designate the uplink path from the second network to the first network based on a reception state of a response message in response to the transferred operation confirmation message.

4. The receiving apparatus of claim 3, wherein the network selection unit is configured to
   transfer the operation confirmation message to the transmitting apparatus through the first network previously designated to be the uplink path, in case the second network is designated to be the uplink path, and
   determine whether or not to re-designate the uplink path to change from the second network to the first one network based on the times of receiving the response message from the transmitting apparatus in response to the operation confirmation message transferred.

5. The receiving apparatus of claim 1, wherein the network state related information includes the information on the difference between the times of receiving the two or more partial data through the first network and the second network, by
   measuring a time between a pair of packets of the first partial data transmitted through the first network, the pair of packets having adjacent sequence information, and
   measuring a time between a pair of packets of the second partial data through the second network, the pair of packets having adjacent sequence information.

6. An operation method performed by a receiving apparatus including one or more processors, the one or more processors to execute the method comprising:
   receiving two or more partial data transmitted from a transmitting apparatus, wherein the two or more partial data are partitioned from data and are simultaneously transmitted through two or more networks including at least first and second networks being different networks of a heterogeneous network, and the two or more partial data include one or more first partial data transmitted through the first network and one or more second partial data transmitted through the second network;
   determine uplink transmission performance based on times of receiving the two or more partial data respectively transmitted through the first network and the second network of the two or more network;
   designating the first network for a uplink path among the two or more networks based on the determination of the uplink transmission performance, the uplink path used for transmitting to the transmitting apparatus the network state related information; and
   transferring network state related information to the transmitting apparatus, the network state related information including information on a difference between the times of receiving the two or more partial data through the first network and the second network,
   wherein the method further comprises
      changing the uplink path from the first network to the second network among the two or more networks, when a request for changing the uplink path is received from the transmitting apparatus.

7. The operation method of claim 6, further comprising when the transmitting apparatus receives the network state related information transferred through the first network,
   receiving the request for changing the uplink path from the transmitting apparatus, and
   changing the uplink path from the first network to the second network among the two or more networks.

8. The operation method of claim 6, further comprising transferring to the transmitting apparatus an operation confirmation message through the first network while the uplink path is currently designated from the first network to the second network, and
   determining whether or not to re-designate the uplink path from the second network to the first network based on a reception state of a response message in response to the transferred operation confirmation message.

9. The operation method of claim 8, wherein the transferring the operation confirmation message comprises
   transferring the operation confirmation message to the transmitting apparatus through the first network previously designated to be the uplink path, in case the second network is designated to be the uplink path.

10. The operation method of claim 8, wherein the determining comprises
   determining whether or not to re-designate the uplink path to change from the second network to the first one network based on the times of receiving the response message from the transmitting apparatus in response to the transferred operation confirmation message transferred.

11. The transmitting apparatus of claim 6, wherein the network state related information includes the information on the difference between the times of receiving the two or more partial data through the first network and the second network, by
   measuring a time between a pair of packets of the first partial data transmitted through the first network, the pair of packets having adjacent sequence information, and
   measuring a time between a pair of packets of the second partial data through the second network, the pair of packets having adjacent sequence information.

12. A transmitting apparatus, comprising:
   a transmitting unit, implemented by one or more processors, configured to
      transmit two or more partial data to a receiving apparatus through two or more networks, wherein the two or more partial data are partitioned from data and are simultaneously transmitted through two or more networks including at least first and second networks being different networks of a heterogeneous network, and the two or more partial data include one or more first partial data transmitted through the first network and one or more second partial data transmitted through the second network, and
      transmit, to the receiving apparatus, a request for changing an uplink path used for transmitting network state related information; and
   a receiving unit, implemented by one or more processors, configured to receive the network state related information through the uplink path, wherein the network state related information includes information on a difference between times of receiving the two or more partial data through the first network and the second network, wherein the uplink path is designated, by the receiving apparatus, to be the first network among the two or more networks based on uplink transmission performance, wherein the uplink transmission performance is determined based on the times of receiving the two or more partial data respectively transmitted through the first network and the second network of the two or more networks.

13. The transmitting apparatus of claim 12, wherein when the transmitting apparatus receives the network state related information through the uplink path of the first network, the transmitting unit is configured to transmit the request for changing the uplink path from the first network to the second network among the two or more networks to the receiving apparatus.

14. The transmitting apparatus of claim 13, wherein when the receiving unit receives an operation confirmation message through the first network previously designated to be the uplink path, in case the second network is designated to be the uplink path in response to the request for changing the uplink path, the transmitting unit is configured to transmit a response message to the receiving apparatus in response to the received operation confirmation message so that the receiving apparatus determines re-designate the uplink path to change from the second network to the one first one network based on a reception state of the response message.

15. An operation method performed by a transmitting apparatus including one or more processors, the one or more processors to execute the method comprising:

transmitting two or more partial data to a receiving apparatus through two or more networks, wherein the two or more partial data are partitioned from data and are simultaneously transmitted through two or more networks including at least first and second networks being different networks of a heterogeneous network, and the two or more partial data include one or more first partial data transmitted through the first network and one or more second partial data transmitted through the second network;

receiving, from the receiving apparatus, network state related information through an uplink path used for transmitting network state related information, wherein the uplink path is designated, by the receiving apparatus, to be the first network among the two or more networks based on uplink transmission performance, wherein the uplink transmission performance is determined based on times of receiving the two or more partial data respectively transmitted through the first network and the second network of the two or more networks; and transmitting, to the receiving apparatus, a request for changing the uplink path, wherein the network state related information includes information on a difference between the times of receiving the two or more partial data through the first network and the second network.

16. The operation method of claim 15, further comprising when the network state related information through the uplink path of the first network is received, transmitting the request for changing the uplink path from the first network to the second network among the two or more networks to the receiving apparatus.

17. The operation method of claim 16, further comprising when an operation confirmation message through the first network previously designated to be the uplink path, in case the second network is designated to be the uplink path in response to the request for changing the uplink path, transmitting a response message to the receiving apparatus in response to the received operation confirmation message so that the receiving apparatus determines re-designate the uplink path to change from the second network to the one first one network based on a reception state of the response message.

* * * * *